(No Model.)

H. W. FISHEL.
BOUTONNIÈRE.

No. 497,407. Patented May 16, 1893.

Witnesses:—
D. N. Hayford
Wm. M. Iliff

Inventor
Henry W. Fishel
By his Attorney
Edwin H. Brown

UNITED STATES PATENT OFFICE.

HENRY W. FISHEL, OF NEW YORK, N. Y.

BOUTONNIÈRE.

SPECIFICATION forming part of Letters Patent No. 497,407, dated May 16, 1893.

Application filed February 20, 1893. Serial No. 462,990. (No model.)

*To all whom it may concern:*

Be it known that I, HENRY W. FISHEL, of New York, in the county and State of New York, have invented a certain new and useful Improvement in Boutonnières, of which the following is a specification.

I will describe a boutonnière embodying my improvement and then point out the novel features in the claims.

Figure 1:
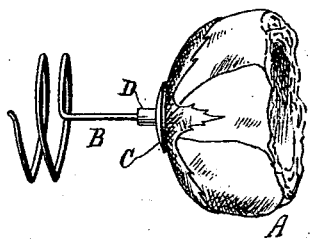
Figure 2:
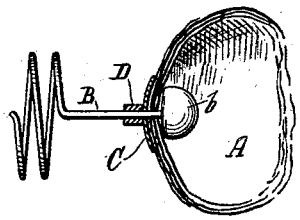
Figure 3:
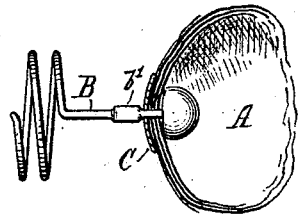
Figure 4:
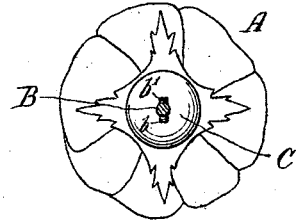
Figure 5:
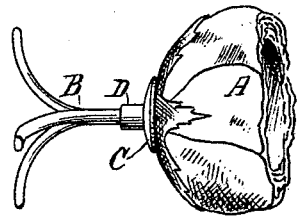

In the accompanying drawings, Figure 1 is a side view of a boutonnière embodying my improvement. Fig. 2 is a longitudinal section thereof. Fig. 3 is a side view of a modified form of boutonnière. Fig. 4 is a transverse section of the latter. Fig. 5 is a perspective view of a boutonnière of modified form.

Similar letters of reference designate corresponding parts in all the figures.

A designates an artificial flower which may be made of celluloid or other suitable material.

B designates a pin engaging with the flower. As here represented, it is passed through the leaves of the flower and is provided with a head $b$ within the flower to secure engagement therewith. At the rear of the flower is a socket, C, consisting of a plate made independently of the pin B and slipped upon the same. Rearward of the socket C is a collar, D, here shown as made independently of the socket and slipped upon the pin B behind the socket. The socket, and the collar as well as the pin may be made of metal. By pinching the collar tightly about the pin with any suitable implement, the socket will be held securely in place. Between the socket and the head of the pin the flower will be properly supported.

The rear extremity of the pin B is shown as coiled into a spiral suitable for passing through a button-hole.

In Figs. 3 and 4, I have shown a boutonnière similar in all particulars to that already described, excepting that the socket is held in place by enlarging the pin B transversely, rearward of the socket. Assuming that the pin B will be round or cylindrical, an engagement may be made by flattening the pin rearward of the socket as at $b'$. This is the construction illustrated in Figs. 3 and 4.

In Fig. 5, I have shown that the rear end of the pin B may be split or divided or composed of several parts suitable for passing through a buttonhole and retaining the boutonnière in the buttonhole.

In any form of my improvement, the socket may be secured in place by soldering or cementing it to the pin.

What I claim as my invention, and desire to secure by Letters Patent, is—

1. In a boutonnière, the combination of an artificial flower or like device, a pin engaging therewith, a socket consisting of an independent plate slipped upon the pin, said socket being held in place by a projection rearward of it, substantially as specified.

2. In a boutonnière, the combination of an artificial flower or like device, a pin engaging therewith, a socket consisting of an independent plate slipped upon the pin and a projection on the pin rearward of the socket for retaining said socket in place, substantially as specified.

3. In a boutonnière, the combination of an artificial flower or like device, a pin engaging therewith and a socket made independently of the pin and secured thereto rearward of the flower or like device, substantially as specified.

In testimony whereof I have signed my name to this specification in the presence of two subscribing witnesses.

HENRY W. FISHEL.

Witnesses:
WM. A. POLLOCK,
NOEL GALE.